United States Patent [19]

Wendel

[11] 4,337,843

[45] Jul. 6, 1982

[54] SONIC WAVEGUIDE ARRANGEMENT USING DIFFERENT WAVEGUIDES AND TECHNIQUE FOR COUPLING THE WAVEGUIDES TOGETHER

[75] Inventor: Richard C. Wendel, Hermitage, Pa.

[73] Assignee: Electric Power Research Institute, Inc., Palo Alto, Calif.

[21] Appl. No.: 171,244

[22] Filed: Jul. 22, 1980

[51] Int. Cl.[3] ........................ G10K 11/00; G01K 1/02; G01N 29/00

[52] U.S. Cl. ........................................ 181/175; 73/644; 374/117

[58] Field of Search ............ 181/18, 22, 175, 196–197; 73/339 A, 644

[56] References Cited

PUBLICATIONS

Murry, "A Unique System for Transmission of Ultrasonic Energy Over Fibrous Bundles", *Ultrasonics* Jul. 1970, pp. 168–173.

*Primary Examiner*—L. T. Hix
*Assistant Examiner*—Thomas H. Tarcza
*Attorney, Agent, or Firm*—Flehr, Hohbach, Test, Albritton & Herbert

[57] ABSTRACT

A sonic waveguide arrangement for use in transmitting sonic energy from one point to another along a non-linear path is disclosed herein and utilizes at least two different waveguides. One which is linear or straight in configuration and one which is curved. The first of these two waveguides is of a type which can transmit sonic energy over a relatively long linear or straight line path with relatively low transmission losses and the second is of the type which can transmit sonic energy over a relatively short curved path with relatively low transmission losses.

7 Claims, 2 Drawing Figures

Figure 1:
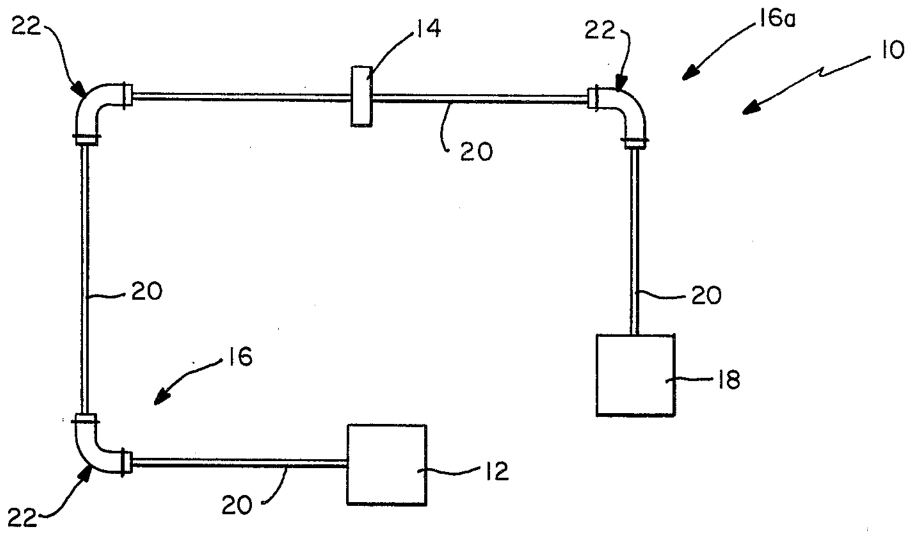

SONIC WAVEGUIDE ARRANGEMENT USING DIFFERENT WAVEGUIDES AND TECHNIQUE FOR COUPLING THE WAVEGUIDES TOGETHER

The utilization of sonic energy as part of a transducer for sensing temperature is known in the art. For example, one system which has been developed uses sonic energy which is varied in having a frequency over a predetermined range as an input to cause the vibratory element in a temperature sensor to vibrate such that energy transfer (or rejection) occurs at resonant frequency. This, in turn, varies with temperature at the sensor. Thus, the sonic energy can be used to monitor the temperature at the sensor. This, in turn, requires transmission of the input energy from its source to the temperature sensor and transmission of the output energy from the sensor to a suitable monitor. Sonic waveguides are presently available for accomplishing this and have been found to be satisfactory where the sonic energy is carried primarily over a linear path or where the path, if curved, is relatively short in length. However, where the path is a relatively long non-linear path, any given waveguide which is otherwise suitable for carrying sonic energy over a relatively long linear path with low transmission losses is not particularly suitable for carrying sonic energy over curved paths. On the other hand, flexible waveguides which may be used to carry sonic energy over a short curved path with relatively low transmission losses are not particularly suitable for carrying sonic energy over a long path.

In view of the foregoing, one object of the present invention is to provide a sonic waveguide arrangement which utilizes at least two different types of sonic waveguides, one which is especially suitable for carrying sonic energy over a relatively long linear path with minimum transmission losses and one which is especially suitable for carrying sonic energy over relatively short curved paths with minimum transmission losses.

Another specific object of the present invention is to provide an uncomplicated, economical and yet reliable technique for coupling together the two types of sonic waveguides referred to immediately above for passing sonic energy therebetween with minimum transmission losses at the junctures therebetween.

Still another specific object of the present invention is to provide the above-mentioned coupling technique in a way which results in a reliable mechanical joint between the waveguides and yet in a way which does not add much weight at the joint for otherwise damping the sonic energy passing therebetween.

Figure 2:
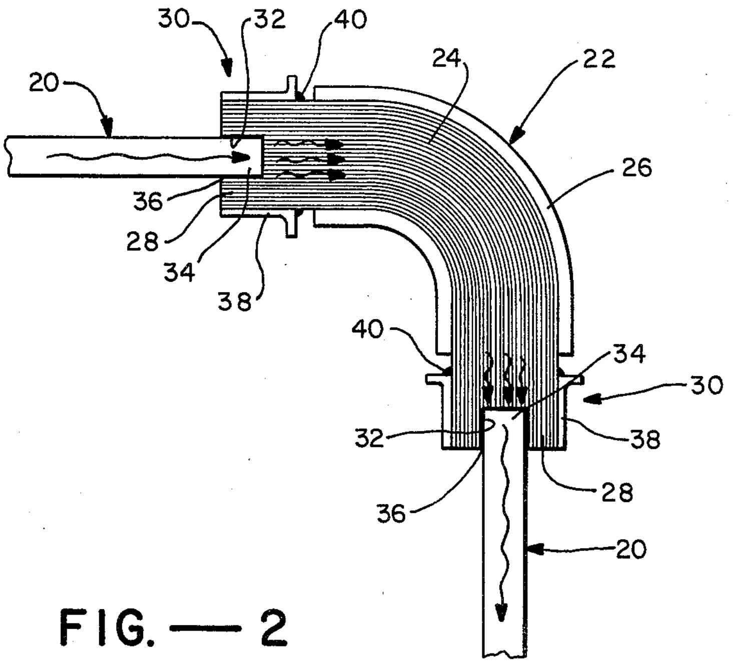

The sonic waveguide arrangement and coupling technique disclosed herein will be described in more detail in conjunction with the drawing, wherein:

FIG. 1 is a diagrammatic illustration of an overall temperature sensing system including sonic waveguide arrangements designed in accordance with the present invention; and FIG. 2 is a sectional view of one section of one of the sonic waveguide arrangements of FIG. 1, particularly illustrating a coupling technique of the present invention.

Turning first to FIG. 1, the temperature sensing system shown there is generally indicated by the reference numeral 10. This system includes conventional or otherwise readily provided means 12 for producing a source of sonic energy which controllably sweeps a predetermined range of frequencies. This energy is transmitted from source 12 to a temperature sensor 14 along a non-linear path by means of a first sonic waveguide arrangement 16 designed in accordance with the present invention. The energy from source 12 is used to cause the vibratory element in sensor 14 to vibrate at various frequencies (according to the sweep) including its resonant frequency, as discussed previously, and thereby provide a sonic energy output which is also temperature sensitive depending on the temperature at the sensor. The sonic energy at the output of sensor 14 is transmitted from the sensor along its own non-linear path by a second waveguide arrangement 16*a* to a suitable device 18 for monitoring the output energy and therefore the temperature at sensor 14. Device 18 may be readily provided and could be appropriately calibrated to provide a direct temperature readout, either in printed form or visually.

With the exception of waveguide arrangements 16 and 16*a*, the components making up overall temperature sensing system 10 including sonic energy source 12, sensor 14 and monitor 18 may be readily available in the prior art or may be readily provided by those with ordinary skill in the art. In any event, these latter components do not form part of the present invention. On the other hand, each of the sonic waveguide arrangements 16 and 16*a* does form part of the present invention along with the particular waveguide coupling technique utilized therewith, as will be described hereinafter.

As seen in FIG. 1, each waveguide arrangement 16 includes linear waveguides 20 and curved waveguides 22. Each waveguide 20 extends from one end thereof to its other end along a linear section of the path defined by the overall waveguide arrangement and each waveguide 22 extends from one end thereof to its other end along a curved section of the overall path. Some or all of the linear path sections may be relatively long. However, all of the curved paths are relatively short, for example, on the order of at most about four or five inches and define a relatively large radius of curvature, for example on the order of two to three inches. Arrangement 16*a* also includes linear waveguides 20 and a curved waveguide 22.

Referring to FIG. 2, attention is directed to the adjacent ends of two adjacent linear waveguides 20 and an intermediate curved waveguide 22. In the embodiment illustrated, each of the waveguides 20 consists essentially of a single rod of sonic energy transmitting material which is also a good electrical insulator, e.g. a dialectric, preferably polyester resin with glass fibers embedded therein. The reasons for using a dialetric material is that is most cases a high voltage is sustained between the sensor and the sending and receiving devices. Waveguide 22 in the embodiment illustrated is comprised of a plurality of flexible fibers, preferably quartz optical fibers, which are generally indicated at 24 and which are maintained in a flexible bundle by means of a circumferential jacket 26 constructed of, for example, TEFLON or like material. As seen in FIG. 2, the size of fiber bundle 24 (in cross-section) is greater than the size of individual rod 20 (in cross-section). As also seen in this figure, the opposite ends of jacket 26 terminate inwardly of their respective ends of fiber bundle 24, thereby exposing opposite end sections of the fiber bundle, indicated generally at 28.

In order to couple one end of the waveguides 20 to an associated end of waveguide 22, a coupling arrangement 30 is provided. Referring to the top lefthand end of waveguide 22 (as viewed in FIG. 2), one coupling arrangement 30 shown there includes an opening 32 extending centrally into end section 28 of fiber bundle 24. This opening serves to receive an end section 34 of the horizontal waveguide 20 shown in FIG. 2. End section 14 is bonded in place by suitable means such as epoxy cement generally indicated at 36. In order to reinforce each exposed end segment 28 of fiber bundle 24, suitable means such as a brass ferrule 38 may be positioned concentrically around the end segment, as also seen in FIG. 2, and maintained in place by suitable bonding means such as epoxy cement 40. The other end of waveguide 22 shown in FIG. 2 is coupled with its associated waveguide in the same manner.

The waveguides 20 and 22 and the way they are coupled together utilizing coupling arrangements 30 provide an overall waveguide arrangement which can define a relatively long non-linear path with minimum transmission losses. In an actual working embodiment, each of the waveguides 20 consists of a polyester rod having embedded glass fibers as described above. These rods and approximately 0.030 inch in diameter. Each of the waveguides 22 in the same actual embodiment include a bundle of 212 quartz optical waveguide fibers contained within the jacket and having exposed end sections reinforced by the brass ferrule described above. The outer diameter of the fiber bundle is approximately 0.060 inch. Each joint 30 in this embodiment is provided by boring a 0.035 inch hole into its associated end section 28. This hole is provided to a depth of one-half the length of the ferrule. Epoxy resin is used to hold the end section of each rod in place. This type of joint is simple, it adds little weight at the joint and therefore minimizes damping of the sonic vibration thereat and it is tight providing good transmission characteristics. Moreover it is mechanically sound.

It is claimed:

1. A sonic waveguide arrangement for use in transmitting sonic energy from one point to another along a non-linear path, said arrangement comprising a first sonic waveguide consisting essentially of a single rod of material extending from one end thereof to its other end along a linear section of said path, a second different sonic waveguide including a plurality of fibers each smaller in cross-section than said rod and means for maintaining said fibers in a flexible bundle larger in cross-section than said rod, said second waveguide extending from one end thereof to its other end along a short, curved section of said path adjacent to said linear path section, and means for coupling adjacent ends of said first and second waveguides together for passing sonic energy therebetween, said first waveguide being of a type which transmits sonic energy over said linear path section with less transmission losses than would said second waveguide if the latter were used to transmit sonic energy over the same linear path section and said second waveguide being of a type which transmits sonic energy over said curved path section with less transmission losses than would said first waveguide if the latter were used to transmit sonic energy over the same curved path section.

2. An arrangement according to claim 1 wherein said coupling means includes adjacent end sections of said first and second waveguides, an opening substantially centrally located in said adjacent end section of said second waveguide for receiving said end section of said first waveguide, said coupling means also including means for bonding said received end section of said first waveguide within said opening.

3. An arrangement according to claim 2 wherein said coupling means also includes a ferrule around said end section of said second waveguide.

4. An arrangement according to claim 3 wherein said rod is formed of polyester having glass fiber embedded therein and wherein said fiber bundle includes quartz optical fibers.

5. A sonic waveguide arrangement for use in transmitting sonic energy from one point to another along a non-linear path, said arrangement comprising a first sonic waveguide consisting essentially of a single straight rod of sonic energy transmitting material which defines a linear section of said path, a second sonic waveguide adjacent said first waveguide and including a plurality of flexible fibers of sonic energy transmitting material and means for maintaining said fibers in a flexible bundle which defines a curved section of said path, and means for coupling adjacent end sections of said waveguides together for passing sonic energy therebetween, each of said fibers in said bundle being smaller in cross-section than said single rod, said bundle being larger in cross-section than said rod, and said coupling means including said adjacent end sections of said waveguides, an opening substantially centrally located in said adjacent end section of said second waveguide for receiving said adjacent end section of said first waveguide, and means for bonding said last-mentioned end section within said opening.

6. An arrangement according to claim 5 wherein said rod is formed of polyester having glass fibers embedded therein and wherein said fiber bundle includes quartz optical fibers.

7. In a sonic waveguide including a first sonic waveguide section consisting essentially of a single straight rod of sonic energy transmitting material and a second sonic waveguide section including a plurality of flexible fibers of sonic energy transmitting material each smaller in cross-section than said rod and means for maintaining said fibers in a flexible bundle having a larger cross-section than the cross-section of said rod, an arrangement for coupling said waveguide sections together for passing sonic energy therebetween, said coupling arrangement comprising: a first end segment of said second waveguide section including an end thereof, said first end segment including an opening therein from its end; a first end segment of said first waveguide section entirely disposed within said opening; and means for bonding said last-mentioned end segment in place within said opening.

* * * * *